United States Patent [19]
Saito et al.

[11] Patent Number: 4,748,013
[45] Date of Patent: May 31, 1988

[54] ADSORBENT FOR RECOVERY OF BROMINE AND BROMINE-RECOVERING PROCESS USING SAME

[75] Inventors: Hiroyuki Saito, Tokuyama; Kazushige Igawa, Shinnanyo, both of Japan

[73] Assignee: Toyo Soda Manufacturing Co., Ltd., Shinnanyo, Japan

[21] Appl. No.: 852,114

[22] Filed: Apr. 15, 1986

[30] Foreign Application Priority Data

Apr. 17, 1985 [JP] Japan ................................. 60-80255

[51] Int. Cl.$^4$ ............................................ C01B 7/00
[52] U.S. Cl. ...................................... 423/241; 55/71; 210/660; 423/500; 423/503
[58] Field of Search .................. 423/500, 503, 241; 55/71, 75; 210/660

[56] References Cited

PUBLICATIONS

Chemical Abstracts, vol. 102, No. 2, 8988y, Recovery of Bromine, Kokai, Jan. 14, 1985.
Chemical Abstracts, vol. 105, No. 4, 26145n, Guard Bed Catalyst for Organic Chloride Removal from Hydrocarbon Feeds, McWilliams et al., Jul. 28, 1986.

*Primary Examiner*—John Doll
*Assistant Examiner*—Lori S. Freeman
*Attorney, Agent, or Firm*—Cushman, Darby & Cushman

[57] ABSTRACT

Bromine is advantageously recovered from a free bromine-containing aqueous solution or gas by placing the solution or gas in contact with an adsorbent comprising a ZSM-5 zeolite having an $SiO_2/Al_2O_3$ molar ratio of at least 70 and heating the adsorbent at a temperature of at least 60° C.

6 Claims, 1 Drawing Sheet

ADSORPTION OF BROMINE IN ZSM-5
($Br_2$ : 2g/$l$, 25°C)

△ ALUMINUM-REMOVED MORDENITE

◇ ALUMINUM-REMOVED ZEOLITE Y

ADSORPTION OF BROMINE IN ZSM-5
($Br_2$ : 2g/$l$, 25°C)

△ ALUMINUM-REMOVED MORDENITE

◇ ALUMINUM-REMOVED ZEOLITE Y

ADSORBENT FOR RECOVERY OF BROMINE AND BROMINE-RECOVERING PROCESS USING SAME

BACKGROUND OF THE INVENTION (1) Field of the Invention

The present invention relates to an adsorbent for the recovery of bromine and a process for recovering bromine from a bromine-containing aqueous solution or gas by using this adsorbent.

(2) Description of the Related Art

As the main industrial material for bromine, sea water, concentrated sea water, bittern, and natural salt water are used. Bromine is always present in these materials, in the form of a dilute solution. The industrial process for the preparation of bromine comprises oxidizing a bromine ion contained in an aqueous solution as mentioned above with an oxidizing agent such as chlorine to form free bromine, and separating and collecting the free bromine from the aqueous solution.

As means for separating and collecting free bromine from the aqueous solution, there have been industrially adopted (a) a method in which free bromine is expelled by air and (b) a method in which the aqueous solution is directly subjected to steam distillation.

However, these methods have advantages and disadvantages. For example, the former method of expelling bromine by air has a problem in that special means is necessary for separating bromine from the air because bromine is taken out in the form of a gaseous mixture with air, and in this method, a chemical such as caustic soda, sodium bromide or sulfurous acid gas is used as the separating means to collect bromine alone. Therefore, an additional step is necessary for recovering bromine in the free form. Accordingly, this method is regarded as a concentrating method rather than a recovering method. In the latter direct steam distillation method, a very large quantity of steam is necessary for the recovery of bromine. In these methods, as seen from the foregoing description, large quantities for a chemical and energy must be used and the costs of the chemical and energy are a large part of the manufacturing cost.

As another bromine-recovering means, a method is known in which free bromine is adsorbed in a strongly basic anion exchange resin. According to this method, an aqueous solution containing free bromine is placed in contact with a strongly basic anion exchange resin to adsorb bromine in the resin, and the bromine is directly recovered by using a chemical having a high reactivity with bromine such as a mixed aqueous solution of caustic soda and sodium sulfite (Japanese Patent No. 212,506) or an aqueous solution of sodium sulfite (U.S. Pat. No. 3,037,845) or by heating the resin by steam distillation (Japanese Unexamined Patent Publication No. 56-59603 and No. 57-129804). Furthermore, a method is proposed in which a bromine-containing gas is placed in contact with a porous, strongly basic anion exchange resin to adsorb bromine in the resin, and the bromine-adsorbed resin is heated by blowing steam into the resin to desorb and recover bromine (Japanese Unexamined Patent Publication No. 55-109201). A strongly basic anion exchange resin can absorb therein free bromine contained in an aqueous solution or gas, but in the method using a chemical for the desorption, an additional step is necessary for recovering free bromine.

The method for desorbing bromine by heating with steam is advantageous in that bromine is directly recovered. However, the strongly basic anion exchange resin generally has unsatisfactory durability characteristics such as oxidation resistance and heat resistance and cannot be regarded as a satisfactory adsorbent which can be used under severe conditions wherein adsorption and desorption operations are repeated on an industrial scale.

SUMMARY OF THE INVENTION

In view of the foregoing, it is a primary object of the present invention to eliminate the foregoing defects involved in the conventional techniques, and to provide an adsorbent comprising a ZSM-5 zeolite having a specific chemical composition, which is capable of directly recovering bromine from a free bromine-containing aqueous solution or gas.

Another object of the present invention to provide a bromine-recovering method by using the ZSM-5 zeolite wherein bromine is recovered from a free bromine-containing aqueous solution or gas.

In accordance with one aspect of the present invention, there is provided an adsorbent for the recovery of bromine, which comprises a ZSM-5 zeolite having an $SiO_2/Al_2O_3$ molar ratio of at least 70.

In accordance with another aspect of the present invention, there is provided a bromine-recovering process comprising placing a free bromine-containing aqueous solution or gas in contact with an adsorbent comprising a ZSM-5 zeolite having an $SiO_2/Al_2O_3$ molar ratio of at least 70, and heating the adsorbent at a temperature of at least 60° C.

DESCRIPTION OF THE PREFERRED EMBODIMENTS

Figure 1:
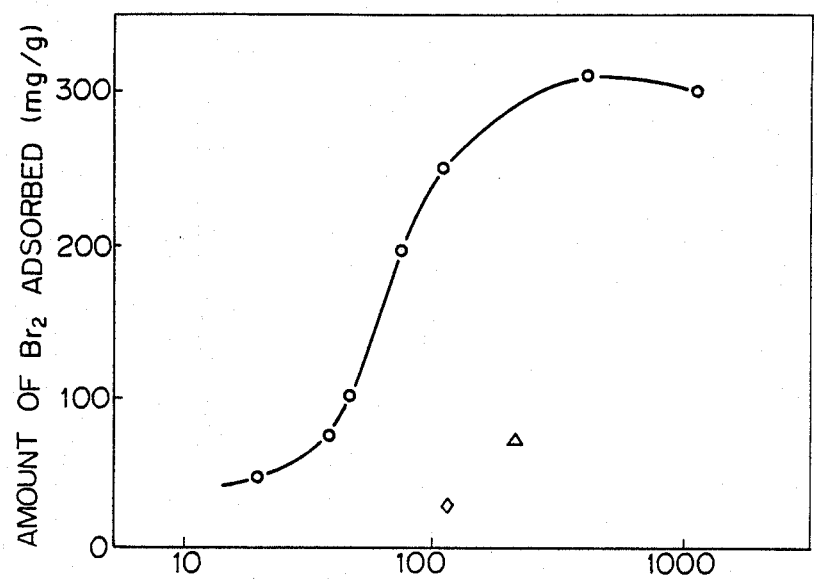
FIG. 1 is a graph showing the relationship of the amount of bromine adsorbed in 1 g of zeolite when the equilibrium bromine concentration is 2.0 g/l, with the $SiO_2/Al_2O_3$ molar ratio.

Generally, zeolite is a crystalline aluminosilicate having a chemical composition represented by the following formula based on $Al_2O_3$: $XM_{2/n}O \cdot Al_2O_3 \cdot ySiO_2 \cdot zH_2O$ wherein M a cation having a valency of n, and x, y, z are 0 or positive numbers, x ordinarily being about 1 and y being at least 2.

The kinds of zeolites are generally decided by y in the chemical composition, that is, the $SiO_2/Al_2O_3$ molar ratio, though they have a different structure to some extent. More specifically, zeolite having a value y of about 2 is a type A zeolite having a value y of 2.5 to 3.5 a type X zeolite, zeolite having a value y of 3.5 to 5.5 is a type Y zeolite, and zeolite having a value Y of 6 to 10 is classified as a type L zeolite, offretite, erionite or ferrierite. Zeolites having a value y of 10 or more include a number of zeolites such as mordenite, ZSM-5, ZSM-8, ZSM-11, ZSM-21, ZSM-34, ZSM-35, and silicalite, and these zeolites are characterized in that they can take an $SiO_2/Al_2O_3$ molar ratio within a broad range of from 10 to 30 or from 10 to the infinitely large number.

Among these many zeolites, only ZSM-5 having an $SiO_2/Al_2O_3$ molar ratio of at least 70 can be used as the adsorbent in the present invention.

As the process for the synthesis of ZSM-5, Japanese Examined Patent Publication No. 46-10064 (U.S. Pat. No. 3,702,886) discloses a process comprising adding an organic base to a reaction mixture comprising a silica source, an alumina source, and an alkali source, and subjecting the mixture to hydrothermal reaction. In the crystal structure of the zeolite synthesized according to this process, an organic cation is included as a part of the cation, and it is considered that products having an $SiO_2/Al_2O_3$ molar ratio of 20 or more are generally synthesized.

It is sufficient if the $SiO_2/Al_2O_3$ of the ZSM-5 zeolite used in the present invention is at least 70. The ZSM-5 zeolite having or an $SiO_2/Al_2O_3$ of at least 70 is directly synthesized, or a ZSM-5 zeolite having an $SiO_2/Al_2O_3$ molar ratio lower than 70 is subjected to a known aluminum-removing treatment such as an acid treatment, a combination of an acid treatment and a hydrothermal treatment, a chelating agent treatment or a high-temperature treatment with silicon tetrachloride, to increase the $SiO_2/Al_2O_3$ ratio to at least 70. A ZSM-5 zeolite having an $SiO_2/Al_2O_3$ molar ratio lower than 70 is not practically preferred because the amount of bromine adsorbed is small. The function of the ZSM-5 zeolite having an $SiO_2/Al_2O_3$ molar ratio of at least 70 is especially prominent in the presence of water. More specifically, where water is present in a bromine-containing gas, if the $SiO_2/Al_2O_3$ molar ratio is lower than 70, the amount of bromine adsorbed is not large, but if this molar ratio is 70 or more, bromine is sufficiently adsorbed even when water is present in a free bromine-containing gas. If the $SiO_2/Al_2O_3$ molar ratio exceeds 100, the adsorption of bromine is not substantially influenced by the presence of water. When free bromine in an aqueous solution is adsorbed, the influence of water is especially strong, and therefore, in this case it is preferred that the $SiO_2/Al_2O_3$ molar ratio be at least 100.

In the as-synthesized state, the cation M of ZSM-5 ordinarily includes an alkali metal ion and a quaternary ammonium ion, but the cation may be exchanged with an other cation, preferably a hydrogen ion. The hydrogen-substituted type may be formed only by calcination of the as-synthesized zeolite, or may be formed by placing the as-synthesized zeolite in contact with a mineral acid or an aqueous solution containing an ammonium ion, and then calcining the zeolite.

The adsorbent comprising the ZSM-5 zeolite according to the present invention includes an adsorbent consisting solely of the ZSM-5 zeolite. However, a molded body of the ZSM-5 zeolite such as a cylindrical product, a spherical product or a granular product is preferable to the ZSM-5 zeolite per se, that is, the ZSM-5 zeolite in the as-prepared powdery form. A binder such as a silica sol, an alumina sol or a clay may be used for molding. Moreover, a so-called binderless molded body formed by molding a starting material mixture and crystallizing the molded body can be used.

There are various free bromine-containing aqueous solutions and gases. As the free bromine-containing aqueous solution, there can be mentioned, for example, solutions formed by adding an oxidizing agent such as chlorine to sea water, concentrated sea water, bittern, natural salt water, or the like, to set bromine free, and solutions formed by scrubbing a bromine-containing gas with sea water, water, an aqueous solution of sodium bromide, or the like, to cause bromine to be absorbed in the scrubbing liquid. The bromine concentration is not particularly critical in the free bromine-containing aqueous solution to be treated according to the present invention, but in order to carry out the process of the present invention effectively, it is preferred that the $Br_2$ concentration be at least 1 g/l, Any so-called generated gas formed by blowing chlorine into a bromine compound-containing gas such as sea water, concentrated sea water, bittern or natural salt water, to effect oxidation and expelling released bromine by air, a bromine-containing gas generated in the bromine-utilizing industry, and other bromine-containing gases can be treated as the free bromine-containing gas in the present invention. The bromine concentration greatly differs in these bromine-containing gases. For example, the generated gas formed in the sea water method has a very low bromine concentration and the bromine concentration is 0.7 to 0.8 mg/l, at highest, but the generated gas formed by the method using bittern or natural salt water has a bromine concentration as high as scores of milligrams per liter. In these generated gases, the presence of water cannot be avoided, and where the bromine concentration is very low as in the case of the generated gas formed according to the sea water method, the influence of water on the adsorption of bromine cannot be neglected. In this case, it is preferred that the gas be placed in contact with the adsorbent of the present invention after water in the gas has been removed to some extent. It is especially preferred that the partial pressure of steam in the bromine-containing gas be not higher 5 mmHg. In the case of a gas having a $Br_2$ concentration of at least 5 mg/l, the adsorption of bromine is not substantially influenced by water, and thus removal of the water is not necessary. Furthermore, if the $SiO_2/Al_2O_3$ molar ratio is higher than 100, the adsorption of bromine is not substantially influenced by water, and removal of the water is not necessary even if the bromine concentration is low.

It is preferred that the contact of the free bromine-containing aqueous solution or gas (called "bromine-containing fluid") with the adsorbent be conducted so that the amount of bromine adsorbed is as large as possible. For this purpose, there may be adopted, for example, a method in which a molded body of the ZSM-5 zeolite is packed in an adsorption column to form a fixed bed and a bromine-containing fluid is passed through the fixed bed, and a method in which a bromine-containing fluid is supplied from the lower portion of the packed column to produce a rising stream and form a fluidized bed and the fluid is thus placed in contact with the adsorbent. In the latter method, it is preferred that the fluid be passed through at least two stages of the fluidized bed, and the adsorbing operation be carried out at a temperature lower than 60° C., preferably at a temperature not higher than 40° C.

Where the fluid is an aqueous solution, it is preferred that the ZSM-5-containing adsorbent of the present invention having sufficient bromine adsorbed therein be sufficiently drained, if necessary after washing with a minimum amount of water, and then subjected to the desorption treatment. Where the fluid is a gas, it is sufficient if the adsorbent is directly heated to effect the desorption. If the ZSM-5-containing adsorbent is heated at a temperature of at least 60° C., preferably at a temperature of at least 100° C., bromine is readily eluted. Accordingly, if cooling is carried out for condensation, liquid bromine can be directly recovered. Heating may be accomplished by placing the zeolite-containing adsorbent indirect contact with steam or heated air, or external heating may be adopted.

The ZSM-5-containing adsorbent which has been subjected to the desorption treatment can be resued for the adsorption.

The present invention is advantageous in he following points, and thus has a high utility in industrial practice.

(1) Since a chemical such as sodium hydroxide, sodium bromide or sulfurous acid gas is not used at all, the material cost can be greatly reduced.

(2) The quantity of energy required for the recovery of bromine is very small.

(3) Since the oxidation resistance and heat resistance of the adsorbent are very high, the adsorbent has a very stable and strong durability.

(4) Since the adsorbent is applicable to any free bromine-containing aqueous solution and gas without limitation, the adsorbent is extremely versatile and has an excellent utility.

The present invention will now be described in detail with reference to the following examples that by no means limit the scope of the invention.

EXAMPLE 1

A zeolite molded body (cylinder having a diameter of 1.5 mm) formed by granulating and molding a mixture comprising 100 parts by weight of a ZSM-5 zeolite powder having an $SiO_2/Al_2O_3$ molar ratio of 100, which was synthesized according to the known method using tetrapropyl ammonium as the organic base, and 25 parts by weight (as $SiO_2$) of a silica sol was calcined in air at 700° C. for 3 hours to form an adsorbent. A glass column having an inner diameter of 2.3 cm was packed with 50 g of this adsorbent (this column will be referred to as the "adsorption column" hereinafter).

Bittern containing $Br_2$ at a concentration of 2.0 g/l, was treated with sulfuric acid to adjust the pH value to 3.0 an chlorine gas was blown into the liquid to set bromine free (the obtained liquid will be referred to as the "starting liquid" hereinafter).

The starting liquid was supplied from the upper portion of the adsorption column and passed through the adsorption column at a flow rate of 500 ml/hr. When the $Br_2$ concentration in the effluent from the outlet of the adsorption column was substantially equal to the $Br_2$ concentration in the starting liquid, the passage of the liquid was stopped, and the amount of bromine adsorbed was measured. It was found that 206 mg of $Br_2$ was adsorbed per gram of the adsorbent. Then, 100 ml of pure water was passed through the adsorption column at the same flow rate as described above to effect washing, and the adsorption column was sufficiently drained. When the column was externally heated at 180° C. and a very small amount of air was blown into the column, 10.3 g of bromine was desorbed and recovered. It was found that bromine was not substantially left in the adsorbent.

COMPARATIVE EXAMPLE 1

A molded body of mordenite of the type H (cylinder having a diameter of 1.6 mm) having a $SiO_2/Al_2O_3$ molar ratio of 104, which was obtained by repeatedly subjecting Zeolon 900Na (supplied by Norton Co.) to the hydrochloric acid treatment and heat treatment, was calcined in air at 700° C. for 3 hours, and by using 50 g of the calcination product, the adsorption test was carried out in the same manner as described in Example 1. It was found that only 80 mg of $Br_2$ was adsorbed per gram of the adsorbent.

EXAMPLE 2 AND COMPARATIVE EXAMPLE 2

Powder of the type H ZSM-5 having an $SiO_2/Al_2O_3$ molar ratio of 20 to 1000, powder of the type H zeolite Y which had been subjected to the aluminum-removing treatment to adjust the $SiO_2/Al_2O_3$ molar ratio to 115, and powder of mordenite of the type H having an $SiO_2/Al_2O_3$ molar ratio of 180 were prepared.

Each zeolite was added to sample solutions which were obtained by dissolving bromine in an aqueous solution containing 3% by weight of sodium chloride and having different bromine concentrations, and the solutions were shaken at 25° C. for 2 hours. With respect to each of the resulting solutions, the relation between the bromine concentration and the amount of bromine adsorbed in the zeolite was determined. The obtained results are shown in FIG. 1, in which the $SiO_2/Al_2O_3$ molar ratio in the zeolite is plotted on the abscissa and the amount of bromine adsorbed in 1 g of the zeolite when the equilibrium bromine concentration was 2.0 g/l, is plotted on the ordinate. It is seen that the ZSM-5 zeolite having an $SiO_2/Al_2O_3$ molar ratio of at least 70 adsorbed a very large amount of bromine.

EXAMPLE 3

A zeolite molded body (cylinder having a diameter of 1.5 mm) formed by granulating and molding a mixture comprising 100 parts by weight of synthetic zeolite powder of the type H ZSM-5 (having an $SiO_2/Al_2O_3$ molar ratio of 400) and 25 parts by weight (as $SiO_2$) of a silica sol was calcined in air at 700° C. for 1 hour to form an adsorbent.

A column having an inner diameter of 2.6 cm was packed with 100 g of the adsorbent, and a bromine/air mixed gas having a $Br_2$ concentration of 80 mg/l, was passed through the column from the upper portion thereof. When the bromine concentration in the gas at the outlet of the column was approximately 80 mg/l, the passage of the gas was stopped and the amount of bromine adsorbed was measured. It was found that $Br_2$ was adsorbed in an amount of 450 mg per gram of the adsorbent. Subsequently, the column was externally heated at 130° C. and a very small amount of air was blown into the column, whereby 42.9 g of bromine was desorbed.

EXAMPLE 4

A zeolite molded body formed by granulating and molding a mixture comprising 100 parts by weight of powder of a ZSM-5 zeolite having an $SiO_2/Al_2O_3$ molar ratio of 400, which was synthesized according to the known method using tetrapropyl ammonium as the organic base, and 25 parts by weight (as $SiO_2$) of a silica sol was calcined in air at 700° C. for 3 hours to obtain an adsorbent. A glass column having an inner diameter of 2.6 cm was packed with 100 g of this adsorbent (adsorption column).

The pH value of concentrated sea water containing bromine at a concentration of 0.18 g/l, was adjusted to 3.0 by sulfuric acid, and chlorine gas was blown into the concentrated sea water to set the bromine free. Bromine was expelled by air to obtain a generated gas having a bromine concentration of 2.3 mg/l, and containing water in an amount corresponding to the saturated vapor pressure at 25° C. The generated gas was passed through the adsorption column from the upper portion thereof. When the bromine concentration in the gas at the outlet of the column was approximately 2.3 mg/l, the passage of the gas was stopped and the amount of bromine adsorbed was measured. It was found that 306 mg of $Br_2$ was adsorbed per gram of the adsorbent. Subsequently, the column was externally heated at 180° C. and a very small amount of air was blown into the column to desorb 30.6 g of bromine.

EXAMPLE 5

A zeolite molded body (cylinder having a diameter of 1.5 mm) formed by granulating and molding a mixture comprising 100 parts by weight of synthetic zeolite powder of the type H ZSM-5 having an $SiO_2/Al_2O_3$ molar ratio of 70 and 25 parts by weight (as $Al_2O_3$) of an alumina sol was calcined in air at 700° C. for 1 hour to obtain an adsorbent. A glass column having an inner diameter of 2.6 cm was packed with 100 g of the adsorbent (adsorption column).

The pH value of bittern containing bromine at a concentration of 2.0 g/l, was adjusted to 3.0 by sulfuric acid and chlorine was blown into the liquid to set the bromine free. Bromine was expelled by air to obtain a generated gas having a bromine concentration of 26.0 mg/l, and containing water in an amount corresponding to the saturated vapor pressure at 30° C. The generated gas was passed through the adsorption column from the upper portion thereof. When the bromine concentration in the gas at the outlet of the column was approximately 26.0 mg/l, the passage of the generated gas was stopped, and the amount of bromine adsorbed was measured. It was found that $Br_2$ was adsorbed in an amount of 420 mg per gram of the adsorbent. Subsequently, air heated at 150° C. was blown into the column, whereby 41.2 g of bromine was desorbed.

We claim:

1. A process for the recovery of bromine, which comprises placing a bromine-containing fluid selected from the group consisting of free bromine-containing aqueous solutions and gases in contact with an adsorbent comprising a ZSM-5 zeolite having an $SiO_2/Al_2O_3$ molar ratio of at least 70 at a temperature not higher than 40° C. whereby bromine is adsorbed by the adsorbent, heating the adsorbent at a temperature of at least 60° C. to desorb gaseous bromine from the adsorbent, and cooling the desorbed gaseous bromine to condense the gaseous bromine whereby the bromine is recovered in the liquid form.

2. A process for the recovery of bromine according to claim 1, wherein the $SiO_2/Al_2O_3$ molar ratio of ZSM-5 is at least 100.

3. A process for the recovery of bromine according to claim 1, wherein the ZSM-5 zeolite is of the type H.

4. A process for the recovery of bromine according to claim 1, wherein the bromine-containing fluid is an aqueous solution having a $Br_2$ concentration of at least 1 g/l.

5. A process for the recovery of bromine according to claim 1, wherein the bromine-containing fluid is a gas having a $Br_2$ concentration of at least 5 mg/l.

6. A process for the recovery of bromine according to claim 4, wherein the adsorbent is heated at a temperature at least 100° C. for desorption.

* * * * *